(12) United States Patent
Hor et al.

(10) Patent No.: US 12,001,353 B2
(45) Date of Patent: Jun. 4, 2024

(54) SYSTEM, APPARATUS AND METHOD FOR SYNCHRONIZING MULTIPLE VIRTUAL LINK STATES OVER A PACKAGE INTERCONNECT

(71) Applicant: Intel Corporation, Santa Clara, CA (US)

(72) Inventors: Joon Teik Hor, Bayan Lepas (MY); Ting Lok Song, Bayan Lepas (MY); Mahesh Wagh, Portland, OR (US); Su Wei Lim, Bayan Lepas (MY)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 17/819,390

(22) Filed: Aug. 12, 2022

(65) Prior Publication Data

US 2023/0026906 A1 Jan. 26, 2023

Related U.S. Application Data

(63) Continuation of application No. 16/426,361, filed on May 30, 2019, now Pat. No. 11,442,876.

(51) Int. Cl.
*G06F 13/16* (2006.01)
*G06F 13/40* (2006.01)
*G06F 13/42* (2006.01)

(52) U.S. Cl.
CPC ...... *G06F 13/1652* (2013.01); *G06F 13/4022* (2013.01); *G06F 13/4269* (2013.01)

(58) Field of Classification Search
CPC ............. G06F 13/1652; G06F 13/4022; G06F 13/4269
See application file for complete search history.

(56) References Cited

U.S. PATENT DOCUMENTS

| | | | |
|---|---|---|---|
| 6,711,411 B1 | 3/2004 | Ruffini | |
| 2005/0034048 A1 | 2/2005 | Nemawarkar et al. | |
| 2010/0083066 A1 | 4/2010 | Sivaramakrishnan et al. | |
| 2014/0281072 A1* | 9/2014 | Yang | G06F 13/4295 710/106 |
| 2015/0074440 A1 | 3/2015 | Cherukuri et al. | |

(Continued)

OTHER PUBLICATIONS

Maurya, Raj, "Importance of the Principle of Equivalence of Hardware and Software", Digital Gyan, Dec. 25, 2019, <https://digitalgyan.org/principle-of-equivalence-of-hardware-and-software/>.*

(Continued)

*Primary Examiner* — Faisal M Zaman
(74) *Attorney, Agent, or Firm* — Trop, Pruner & Hu, P.C.

(57) ABSTRACT

In one embodiment, an apparatus includes an arbitration circuit with virtual link state machines to virtualize link states associated with multiple communication protocol stacks. The apparatus further includes a physical circuit coupled to the arbitration circuit and to interface with a physical link, where the physical circuit, in response to a retraining of the physical link, is to cause a plurality of the virtual link state machines to synchronize with corresponding virtual link state machines associated with a second side of the physical link, and where at least one of the communication protocol stacks is to remain in a low power state during the retraining and the synchronization. Other embodiments are described and claimed.

20 Claims, 11 Drawing Sheets

(56) References Cited

U.S. PATENT DOCUMENTS

| | | | |
|---|---|---|---|
| 2015/0103677 A1* | 4/2015 | Lee | H04L 41/0896 |
| | | | 370/249 |
| 2015/0234668 A1* | 8/2015 | Ravinoothala | G06F 9/5088 |
| | | | 718/1 |
| 2016/0179427 A1* | 6/2016 | Jen | G06F 3/0625 |
| | | | 711/147 |
| 2016/0359982 A1 | 12/2016 | Shih et al. | |
| 2017/0083475 A1* | 3/2017 | Wu | G06F 13/4273 |
| 2019/0007341 A1* | 1/2019 | Clarke | H04L 49/30 |
| 2019/0064909 A1 | 2/2019 | Bito | |
| 2019/0227972 A1* | 7/2019 | Hor | G06F 13/4265 |

OTHER PUBLICATIONS

Definition of "doubleword", Dictionary.com, retrieved from the Internet on Sep. 5, 2023 at <https://www.dictionary.com/browse/double%20word>.*

U.S. Appl. No. 16/373,472, filed Apr. 2, 2019, entitled "Virtualized Link States of Multiple Protocol Layer Package Interconnects," by Joon Teik Hor, et al.

* cited by examiner

SYSTEM, APPARATUS AND METHOD FOR SYNCHRONIZING MULTIPLE VIRTUAL LINK STATES OVER A PACKAGE INTERCONNECT

CROSS REFERENCE TO RELATED APPLICATION

This is a continuation of U.S. application Ser. No. 16/426,361, filed May 30, 2019, the content of which is hereby incorporated by reference.

TECHNICAL FIELD

Embodiments relate to communications via an in-package interconnect.

BACKGROUND

As process technology development becomes more and more complex, a multi-chip package (MCP) solution in which a collection of multiple smaller dies is connected to each other becomes more and more important. Multiple communication protocol layers in these smaller dies can be time multiplexed and connected with each other using a single on-package interconnect. In order for these communication protocol layers to be independent from each other, each of the protocol layers can be assigned a virtual link state respectively. As MCP usage consumes more and more bandwidth, interconnect clocking frequency increases, thus causing transmission over the link to be lossy over time. In general when errors happen, the link undergoes a retraining phase followed by a retry by the communication protocol layers.

DETAILED DESCRIPTION

In various embodiments, an interconnect structure is provided that can accommodate communications of multiple disparate communication protocols, via a single interconnect and a single physical layer circuit. While power consumption and chip area may be reduced in this manner, there can be complexities in that the different communication protocols may be at different link states. And, should link errors occur, retraining of the link may be performed that desirably avoids impacting inactive communication protocols. As such in embodiments, so-called virtual link state machines may be associated with different layers of the communication stack and can be used to virtualize link states. In addition, embodiments enable virtual link state machine pairs coupled to different sides of the interconnect to perform synchronization of their link states following a mis-synchronization in a manner that allows idle communication protocols to be maintained in an idle state during the retraining and synchronization, as will be described further herein.

Figure 1:
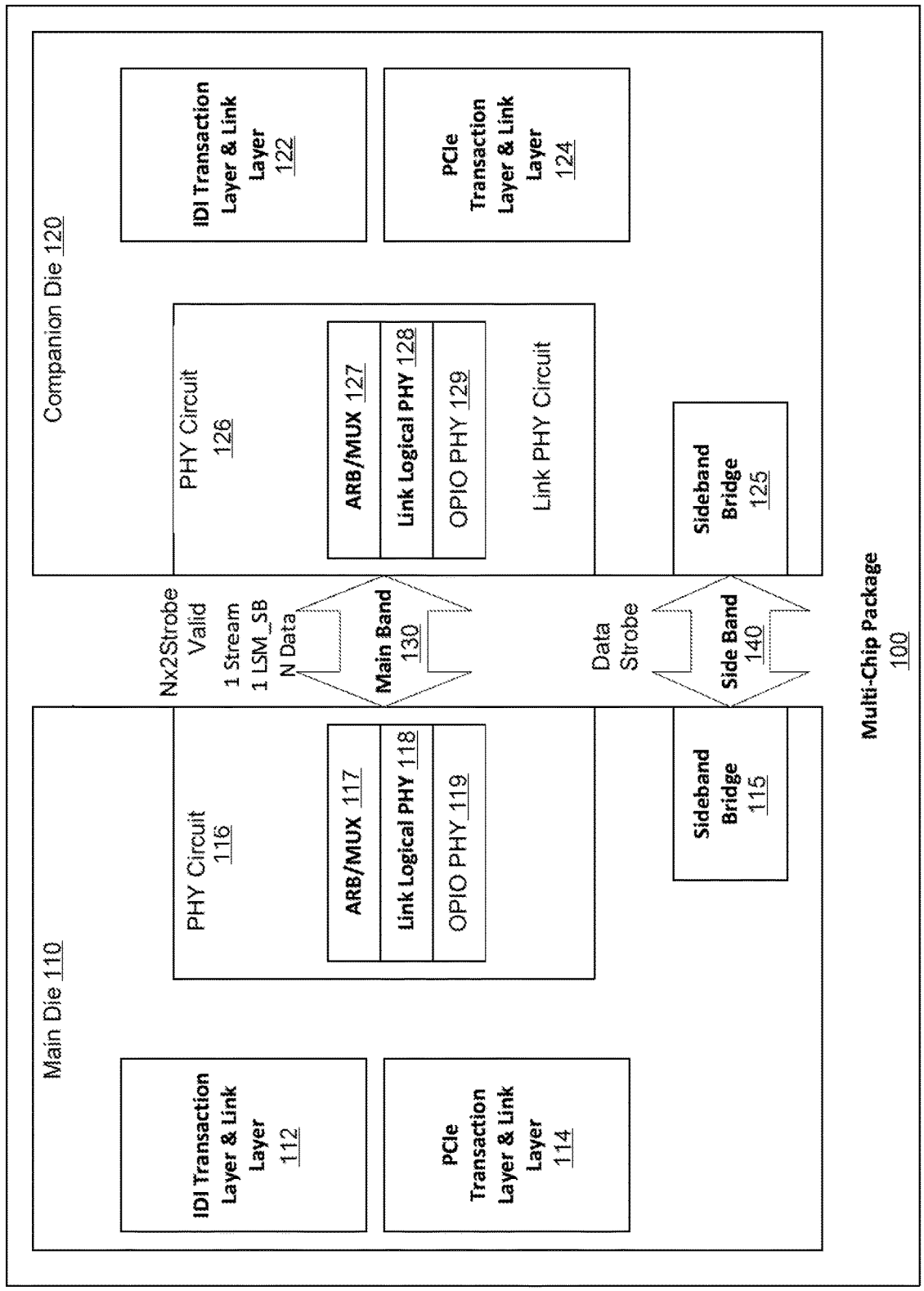
FIG. 1 is a block diagram of an integrated circuit in accordance with an embodiment of the present invention.

Referring now to FIG. 1, shown is a block diagram of an integrated circuit in accordance with an embodiment of the present invention. As shown in FIG. 1, integrated circuit 100 is implemented as a multi-chip package including a first die 110 and a second die 120. In embodiments herein, first die 110 may be a main die, such as a main processing die including one or more processing cores and other circuitry (not shown for ease of illustration in FIG. 1). In turn, second die 120 may be implemented as a companion die, which may include various accelerator and ancillary circuitry such as chipset circuitry, peripheral controller circuitry, and peripheral devices such as Peripheral Component Interconnect Express (PCIe) devices.

As seen, first die 110 is in communication with second die 120 via a primary or main interconnect or link 130 and a secondary or sideband interconnect or link 140. In an embodiment, interconnect 130 may be implemented as a given intra-package link including a plurality of serial interconnects travelling in each direction. Interconnects 130, 140 may be implemented using physical electrical connections such as wires implemented as lanes, which in some cases may be serial uni-directional lanes. As shown, in each direction NX2 strobe interconnects are present, namely N valid interconnects, one stream interconnect, one link state machine sideband interconnect and N data interconnects. Details of these different interconnects and the communications thereon are described further below. Sideband interconnect or link 140 may be formed of a plurality of serial interconnects, namely a single data interconnect and a single strobe interconnect, in each direction. Various high speed communications of data, commands, instructions and so forth may occur via main band interconnect 130, while lower speed out-of-band communications may occur via sideband interconnect 140.

With reference to main die 110, note the presence of multiple protocol layers, including a first protocol layer 112 and a second protocol layer 114. In the embodiment shown, first protocol layer 112 is for an intra-die interconnect (IDI) communication protocol, and includes a transaction layer and a link layer for this communication protocol. In turn, second protocol layer 114 is for a Peripheral Component Interconnect Express (PCIe) communication protocol, and includes a transaction layer and a link layer for this communication protocol. These protocol layers are also referred to herein as "communication protocol stacks," to signify inclusion of protocol and link layers of a communication protocol (but not a physical layer).

In general, a transaction layer generates transaction layer packets (TLP), which can be request or response-based packets separated by time, allowing the link to carry other traffic while the target device gathers data for the response. The transaction layer further handles credit-based flow control. Thus a transaction layer provides an interface between a device's processing circuitry and the interconnect architecture. In turn, the link layer may sequence TLPs and ensure reliable delivery of TLPs between two endpoints (including handling error checking) and acknowledgement processing. Thus the link layer operates as an intermediate stage between the transaction layer and a physical layer, and provides a reliable mechanism for exchanging TLPs between two components by a link.

Communications between corresponding protocol layers of the different die occur via a single physical (PHY) unit circuit (generally "PHY circuit" herein) 116. In the embodiment shown, PHY circuit 116 includes an arbitrator/multiplexer layer 117, a link logical PHY layer 118, and an on-package input/output (OPIO) physical layer 119. PHY circuit 116 provides an interface to the physical connection or link over which data is communicated between dies 110, 120, and may include signal conditioning circuitry and logic to enable high data rate and channel configuration capabilities. Link logical PHY layer 118 may include circuitry to enable clocking, link state management for protocol layers and protocol multiplexing between the different communication protocols. Although the scope of the present invention is not limited in this regard, there may be multiple channels of communication provided that may include corresponding data lanes and one or more dedicated lanes for strobe and clock signals, valid signals and so forth. Note that similar layers are present on companion die 120, which as shown includes first communication protocol stack 122 (e.g., IDI stack) and second communication protocol stack 124 (e.g., PCIe stack). In addition, companion die 120 further includes PHY circuit 126 including an arbitrator/multiplexer layer 127, a link logical PHY layer 128, and an OPIO physical layer 129.

Link logical PHY layer 118 may thus support multiplexing between multiple communication protocols. Such multiplexing may be implemented, in an embodiment, by assertion of an encoded stream signal to identify a corresponding communication protocol for data sent on corresponding data lanes. In addition, link logical PHY layer 118 further may be used to negotiate link state transitions for the communication protocols, along with performing operations with regard to link training, error detection, skew detection or so forth.

Arbitrator/multiplexer layer 117 may be used to arbitrate between different communication protocols. In this way, communications of these different protocol layers may be handled in a shared manner via this single PHY circuit. To effect sideband communications, main die 110 further includes a sideband bridge 115 to manage communications via sideband interconnect 140.

With an arrangement as in FIG. 1, protocol layers 112, 114 (e.g.,) may be time multiplexed and connected with each other via single on-package interconnect 130. In general, each protocol layer can have control of its own link states. However, multiple protocol layers that tunnel through the same interconnect may operate in an agnostic manner with respect to each other. Such independent operation may create contention as to control of the link state between these multiple protocol layers. To effect sharing of a single PHY circuit by multiple protocol layers in a time multiplexed manner, virtual link states may be associated with each of the protocol layers. With virtualized link states for each protocol layer, the underlying protocol layers may be presented with the appearance of ownership of the link states.

Understand while shown at this high level in the embodiment of FIG. 1, many variations and alternatives are possible. For example, while the above implementation shows use of two protocol layers corresponding to PCIe and IDI, many other communication protocols may be supported, including PCI, Quick Path Interconnect (QPI) among others.

And while two protocol layers are shown for ease of illustration in the embodiment of FIG. 1, it is possible for more than two protocol layers to be present in individual die of a multi-chip package. In addition, by way of PHY unit circuitry as described herein, coupling of a serial deserializer-based PHY (e.g., for PCIe, Ethernet, Infiniband or other high speed SerDes) on one die to upper layers implemented on another die also may occur.

Figure 2:
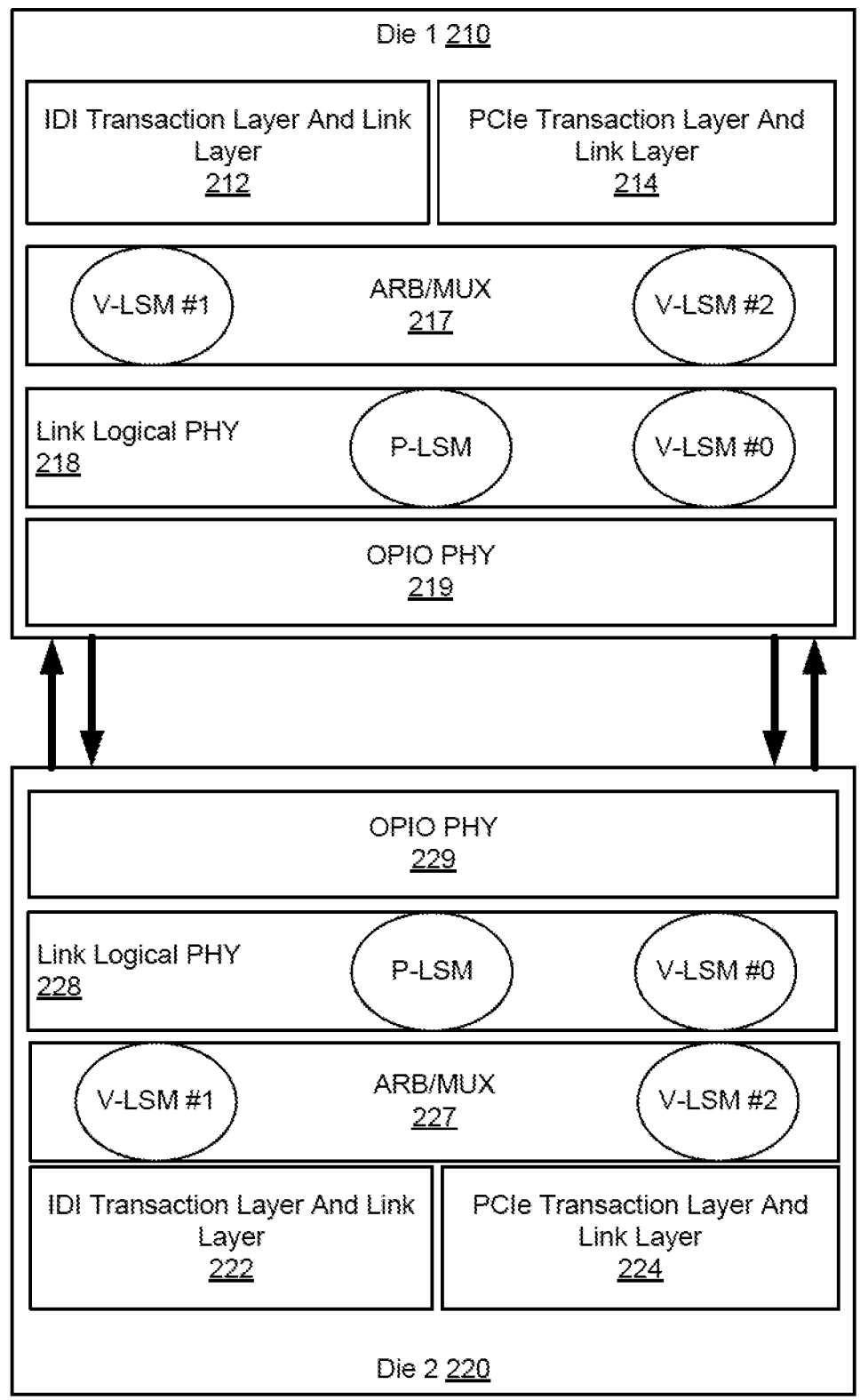
FIG. 2 is a block diagram of a multi-chip package in accordance with an embodiment.

Referring now to FIG. 2, shown is a further block diagram of a multi-chip package, including representations of physical link state machines and virtual link state machines in accordance with an embodiment. As shown in FIG. 2, integrated circuit 200 is a multi-chip package that may be adapted similarly to IC 100 of FIG. 1. As such, multiple protocol layers are present on each of multiple dies 210 and 220. To enable these different protocol layers to interface with a single physical unit, multiple virtual link state machines may be provided within arbitration and multiplexer layers 217, 227. More specifically, with respect to first die 210, its arbitration and multiplexer layer 217 includes two virtual link state machines, a first of which (V-LSM1) is associated with and virtualizes the link state of IDI protocol layer 214, and a second of which (V-LSM2) is associated with and virtualizes the link state of PCIe protocol layer 212.

As further illustrated in FIG. 2, link logical PHY layers 218, 228 include a physical link state machine (P-LSM) and a virtual link state machine (V-LSM0). In turn, V-LSM0 virtualizes the link state of corresponding arbitration/multiplexer layers 217, 227.

Note that while FIG. 2 is illustrated at a high level, understand that a defined logical PHY interface (LPIF) may be present between the different layers. These LPIFs may be represented by the virtual link state machines so that any given communication protocol can interface with the single PHY unit of the corresponding die. As such, an LPIF may be provided as an interface on either side of arbitrator/multiplexer layers 217, 227. Such LPIFs can abstract the logical and electrical/analog circuitry of the PHY unit from the protocol layers so that a PHY unit of one communication protocol can be used to communicate data originating or directed to transaction and link layers of another communication protocol in a transparent manner. In this way, modularity and re-use of design may be realized, so that upper layers of a communication protocol may remain intact when used with signaling technology of a given PHY unit.

Thus as shown in FIG. 2, each die has its own sets of physical and virtual link state machines that are a mirrored version of the other die. In embodiments, P-LSMs may be configured to govern the actual physical link state, while each protocol layer has its own link state virtualized by a corresponding V-LSM.

The following list provides example link states that can be virtualized in embodiments:

| | |
|---|---|
| 1) | Reset |
| 2) | Active (L0) |
| 3) | Idle (L1) |
| 4) | Sleep (L2) |
| 5) | Retrain/Recovery |
| 6) | Disable |
| 7) | Link Reset |
| 8) | Link Error. |

Understand while these example link states are shown, other link states can be virtualized in other embodiments.

By virtualizing the link states, protocol layers can be agnostic to each other, thus enabling the protocol layers' hardware and/or software drivers to control their own link states as if they own the link exclusively. As a result hardware/software adoption complexity is reduced, as protocol layers are shielded by the V-LSM from the need to understand the concept of a shared/multiplexed link. Furthermore, by having V-LSMs, protocol layers are allowed to enter idle states (thus enabling power management features) independently of each other.

Figure 3:
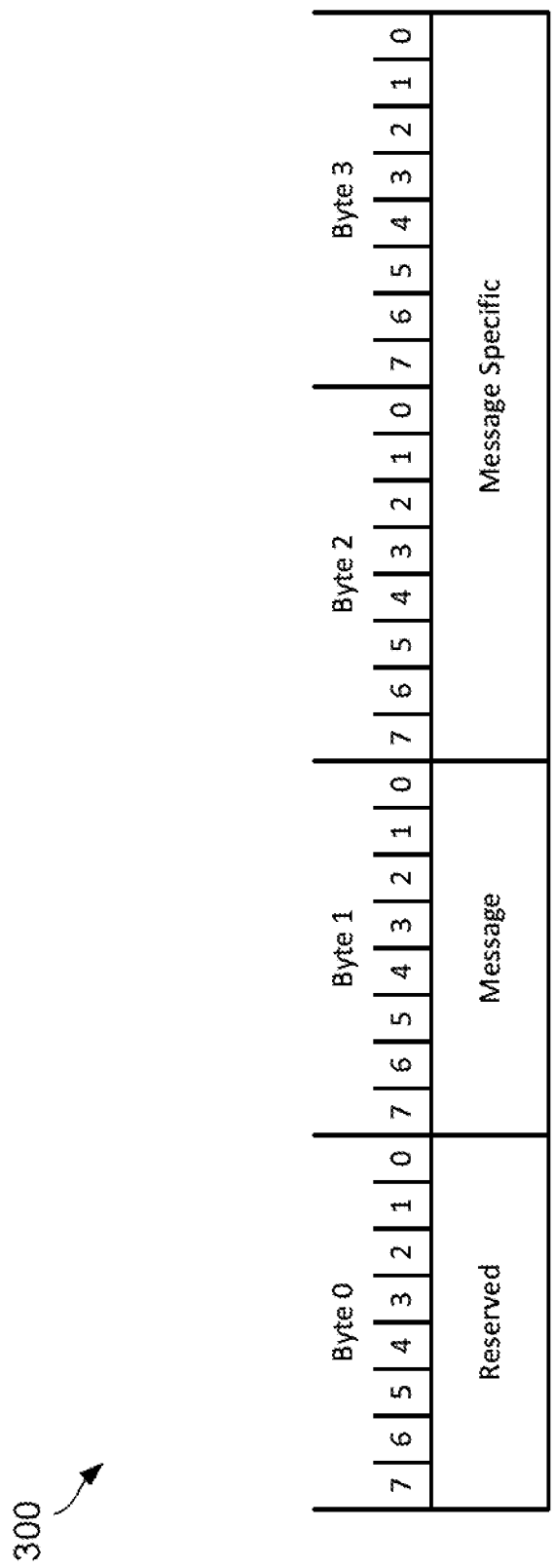
FIG. 3 is a schematic diagram of an example physical layer packet (PLP) format in accordance with embodiments of the present disclosure.

FIG. 3 is a schematic diagram of an example physical layer packet (PLP) format in accordance with embodiments of the present disclosure. Virtualization of link state machines is achieved by having each die's V-LSM communicate with each other over the on-package interconnect using a physical layer packet (PLP), which in an embodiment is a double-word (1DW) data packet that originates from one physical layer (e.g., logical PHY or ARB-MUX layer) and terminates at the opposite physical layer. FIG. 3 illustrates a generic structure/format for a PLP 300. The PLPs used for virtualization of the V-LSMs are called LPIF_STATE_CONTROL PLPs. The specific definition of Byte1, Byte2 and Byte3 of such PLPs are shown in Tables 1 and 2 below.

TABLE 1

| Message Encoding [Byte 1] | Description |
| --- | --- |
| 0000_0001 | LINK_CONTROL: Used to configure the link and for ACTIVE to Next state transition. Request type PLP is sent only from upstream devices to downstream devices. Acknowledgement PLP type is sent only from downstream devices to upstream devices. |
| 0000_0010 | FLUSH: Used to do an in-band flush of all packets before specific state changes. This PLP is sent from both upstream and downstream devices. |
| 0000_0011 | Reserved |
| 0000_0100 | PM_ENTER_IDLE_L1: Used by downstream devices to request entry into IDLE_L1. This PLP is sent only from downstream devices to upstream devices. |
| 0000_0101 | PM_ENTER_SLEEP_L2: Used by downstream devices to request entry into IDLE_L2. This PLP is sent only from downstream devices to upstream devices. |
| 0000_1111 | PM_REQUEST_NAK: Used by upstream devices to NAK L1 entry request from downstream devices. This PLP is sent only from upstream devices to downstream devices. |
| 0000_1000 | LPIF_STATE_CONTROL: Used to control LPIF state transition. This PLP is sent from both upstream and downstream devices. |
| All Others | Reserved |

TABLE 2

| | Description |
| --- | --- |
| Byte 2 Bit | |
| 3:0 | LPIF State Encoding:<br>0000: RESET (For Status Only)<br>0001: ACTIVE<br>0010: Reserved<br>0011: Deepest Allowable PM State (For Request Only)<br>0100: L1.1<br>0101: L1.2<br>0110: L1.3<br>0111: L1.4<br>1000: L2 |

TABLE 2-continued

| | Description |
| --- | --- |
| | 1001: LINKRESET<br>1010: LINKERROR (For Status Only)<br>1011: RETRAIN (For Status Only)<br>1100: DISABLE<br>1101: Reserved<br>1110: Reserved<br>1111: Reserved |
| 6:4 | Reserved |
| 7 | Request/Status Type<br>1: LPIF_STATE_CONTROL Request PLP<br>0: LPIF_STATE_CONTROL Status PLP |
| Byte 3 Bit | |
| 3:0 | LPIF Instance Number: Indicates the targeted LPIF interface when there's multiple LPIF interfaces present.<br>Note: Use a value '0000b' in the case of single LPIF interface. |
| 7:4 | Reserved |

The LPIF_STATE_CONTROL PLP is used as a full handshake between the matching V-LSMs on both die to convey request and status for the virtualized link states. A V-LSM can send a LPIF_STATE_CONTROL Request (a.k.a. STATE_REQ) PLP to convey its intention to enter a specific virtualized link state. The receiver of the PLP can respond with a LPIF_STATE_CONTROL Status (a.k.a. STATE_STS) PLP once it is ready to enter into the requested virtualized state.

As mentioned above, as an on-package interconnect scales to higher speeds, it becomes more susceptible to link errors. Usually each protocol link layer implements some form of error detection and recovery logic to overcome these errors. The recovery process generally involves retraining the entire link and then retrying the erroneous packets. This process impacts all protocol layers.

However in a multi-protocol layer on-package interconnect with virtual link states, these different protocol layers are likely to have orthogonal activities with each other, as described above. Thus each of these protocol layers could be at different virtual link states at any one time. Protocol layers at their low power management states are idle and quiescence already. Hence, the erroneous packet could only come from one of the active protocol layers or the physical layer itself. Without an embodiment, all protocol layers are blindly impacted by a recovery process, which causes inactive protocol layers to be woken up from their low power management states (e.g., clock gated, power gated or power removed state), which can adversely impact power efficiency.

Embodiments may use PLPs as described above with respect to FIG. 3 for link state virtualization flow. When an error occurs within such PLP during a virtual link state entry or exit flow, it could lead to virtual link state machines on both dies to be out of sync with each other. For example, during an Idle (L1) entry flow, when a PLP error occurs during a status handshake protocol, one virtual link state machine of a first die may move to the Idle (L1) state, while its corresponding virtual link state machine of a second die remains at Active (L0) state. Without an embodiment, resolution of this mis-synchronization may require impacting all virtual state machines and upper protocol layers, even those in low power states.

To avoid this situation and reduce power impact of a link recovery, embodiments provide hardware autonomous techniques that may be implemented within the physical layer to recover the link and perform synchronization of virtual link state machines in a power efficient and localized manner without the need for protocol layer intervention. To this end, embodiments are configured to operate such that when an error happens and a link recovery flow is triggered, only the active protocol layers are notified by the physical layer so that appropriate recovery flow may be taken by these active layers. Non-active protocol layers are left at their previous state prior to recovery. Once the P-LSM has completed its recovery via a retraining flow, each V-LSM autonomously sends status information regarding its link state. More specifically, in an embodiment, each V-LSM may send a status PLP to its opposite counterpart informing the virtual link state it was in prior to the recovery flow. The purpose of this PLP exchange is to synchronize back each V-LSM pair with each other, prior to allowing any other protocol layer activities to take place. Note that after this synchronization of V-LSMs, active upper level protocol layers may perform appropriate retraining operations, while inactive upper protocol layers remain inactive.

Table 3 below illustrates an embodiment of operations performed in response to error detection that allows an inactive protocol layer (Protocol Layer #2) to remain in a link idle state ("Idle") throughout the retraining flow.

TABLE 3

| | | Link State Machine Status | | | |
|---|---|---|---|---|---|
| Seq# | Events | V-LSM #2 | V-LSM #1 | V-LSM #0 | P-LSM |
| 1 | Error detected | Idle | Active | Active | Active |
| 2 | Recovery/Retraining flow triggered | Idle | Retrain | Retrain | Retrain |
| 3 | P-LSM returns to Active state | Idle | Retrain | Retrain | Active |
| 4 | V-LSM #0 PLP synchronization done | Idle | Retrain | Active | Active |
| 5 | V-LSM #1 PLP synchronization done | Idle | Active | Active | Active |
| 6 | V-LSM #2 PLP synchronization done | Idle | Active | Active | Active |

In contrast, without an embodiment, an inactive protocol layer (again, Protocol Layer #2) is caused to exit its idle state, as illustrated in Table 4 to effect a retraining. In addition, Table 4 also shows that protocol layer intervention is involved to return the virtual link state machine to an Active state.

TABLE 4

| | | Link State Machine Status | | | |
|---|---|---|---|---|---|
| Seq# | Events | LSM #2 | LSM #1 | LSM #0 | P-LSM |
| 1 | Error detected | Idle | Active | Active | Active |
| 2 | Recovery/Retraining flow triggered | Retrain | Retrain | Retrain | Retrain |
| 3 | P-LSM returns to Active state | Retrain | Retrain | Retrain | Active |
| 4 | V-LSM #0 returns to Active state | Retrain | Retrain | Active | Active |
| 5 | Protocol Layer #1 recovery flow done | Retrain | Active | Active | Active |
| 6 | Protocol Layer #2 recovery flow done | Active | Active | Active | Active |

Thus in embodiments, synchronization of the virtual link states post retraining is achieved by having each die's V-LSMs communicate with each other over the on-package interconnect using a PLP. More specifically, the PLPs used for synchronization of the V-LSMs are the LPIF_STATE_CONTROL PLPs, as defined with particular values of Byte1, Byte2 and Byte3 of Tables 1 and 2.

In embodiments this LPIF_STATE_CONTROL PLP is used in a synchronization handshake protocol between the matching V-LSMs on both dies. When it is triggered for synchronization, each V-LSM sends a LPIF_STATE_CONTROL Status (aka STATE_STS) PLP to convey the status for its virtualized link state prior to the retraining process. Note that the trigger for the ARB-MUX layer is the LPIF interface between the logical physical layer and the ARB-MUX layer having its STATE_STS moving from Retrain to Active. Information obtained via a transmission and receipt of a synchronization STATE_STS PLP may be used to determine an appropriate resolved link state for the V-LSM. More specifically, in an embodiment, a V-LSM may access a lookup table, implemented in one embodiment as a resolution table (which may be hardwired or configurable via software or BIOS), to determine an appropriate link state to enter into post retraining. Table 5 below shows an example implementation of a resolution table.

TABLE 5

| Synchronization STATE_STS PLP | | Resolution Action on STATE_STS | |
|---|---|---|---|
| Main Die | Companion Die | Main Die | Companion Die |
| Reset | Reset | Reset | Reset |
| Active | Active | Active | Active |
| Idle | Idle | Idle | Idle |
| Sleep | Sleep | Sleep | Sleep |
| Retrain | Retrain | Retrain | Retrain |
| Disable | Disable | Disable | Disable |
| LinkReset | LinkReset | LinkReset | LinkReset |
| LinkError | LinkError | LinkError | LinkError |
| Reset | Active | Active | Active |
| Reset | Sleep | Reset** | Sleep |
| Active | Reset | Active | Active |
| Active | Retrain | Active | Active |
| Active | Disable | Disable | Disable |
| Active | LinkReset | LinkReset | LinkReset |
| Idle | Active | Idle | Idle |
| Idle | Retrain | Idle | Retrain** |
| Sleep | Reset | Sleep | Reset** |
| Sleep | Active | Sleep | Sleep |
| Retrain | Active | Active | Active |
| Retrain | Idle | Retrain** | Idle |
| Disable | Reset | Disable | Reset** |
| LinkReset | Reset | LinkReset | Reset** |
| LinkError | Reset | LinkError | Reset** |

As illustrated in Table 5, a resolution table includes a plurality of entries. A given entry may be looked up using a link state pair, namely the link state for the corresponding V-LSMs for the two dies prior to the retraining process. Based on access in this manner, a resolution action may be taken according to the corresponding resolved link state identified for the given die in the entry of the resolution table. As one representative example with regard to Table 5, assume that a main die, prior to a retraining was in an Active link state and the corresponding V-LSM of the companion die was in a Disable state. In this instance, by access to an entry of the resolution table based on these states, both V-LSMs may be resolved to the link state of Disable. Understand while the resolution table of Table 5 provides example resolution actions for corresponding prior link states, other resolutions actions are possible in other implementations. And of course, understand that a resolution table may take other forms in different embodiments.

Figure 4:
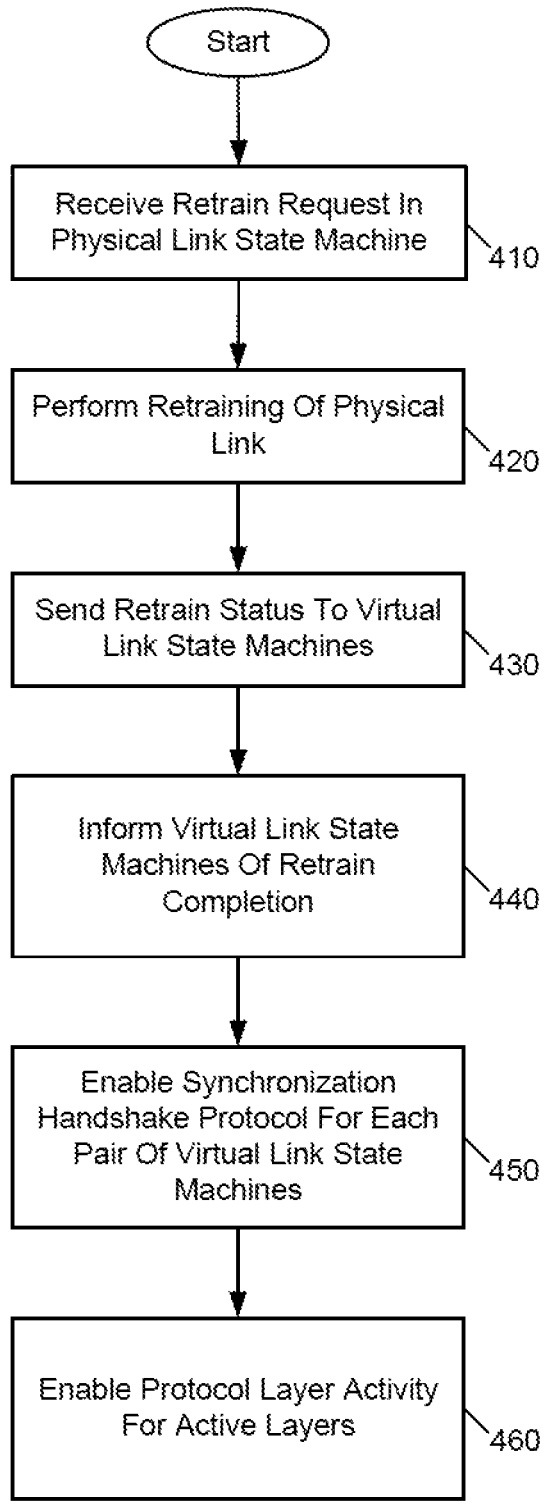
FIG. 4 is a flow diagram of a method in accordance with an embodiment of the present invention.

Referring now to FIG. 4, shown is a flow diagram of a method in accordance with an embodiment of the present invention. More specifically, method 400 of FIG. 4 is a high level method for performing synchronization of virtual link state machines following a retraining, in accordance with an embodiment. As such, method 400 may be performed by hardware circuitry, firmware, software and/or combinations thereof. In a particular embodiment, method 400 may be performed by various physical layer circuitry.

As illustrated, method 400 begins by receiving a retraining request in a physical link state machine (block 410). This retraining request may be received in response to detection of an error in a packet communication. This error detection may occur in one of various layers of a communication protocol. Regardless of the reason for the retrain request, at block 420 the physical link state machine performs retraining of the physical link. Such retraining may include various operations to configure the link for appropriate speed and bandwidth (among possibly other operating parameters) and to send and receive test data at a desired accuracy rate.

Still with reference to FIG. 4, in connection with this retraining, a retrain status is sent to corresponding virtual link state machines on both sides of the interconnect (block 430). At the successful completion of retraining, the physical link state machine informs the virtual link state machines of the completion (block 440). Thereafter at block 450, a synchronization handshake protocol may be enabled for each pair of virtual link state machines. For example, the physical link state machine may first cause a first pair of virtual link state machines (e.g., a pair closest to the physical link state machine such as present in a link logical layer of the PHY circuit) to initiate a synchronization handshake protocol. Note that after this pair of virtual link state machines concludes its synchronization handshake protocol, the pair may cause the next higher level pair of virtual link state machines to similarly perform a synchronization handshake protocol, and so on.

With further reference to FIG. 4, at block 460 at the conclusion of the synchronization handshake protocols for each virtual link state machine pair, any active protocol layers may be enabled for activity. After enabling these protocol layers, protocol layer communications may occur. For example, a failing message that caused the retraining may be retried by a given protocol layer. Understand while shown at this high level in the embodiment of FIG. 4, many variations and alternatives are possible.

Figure 5:
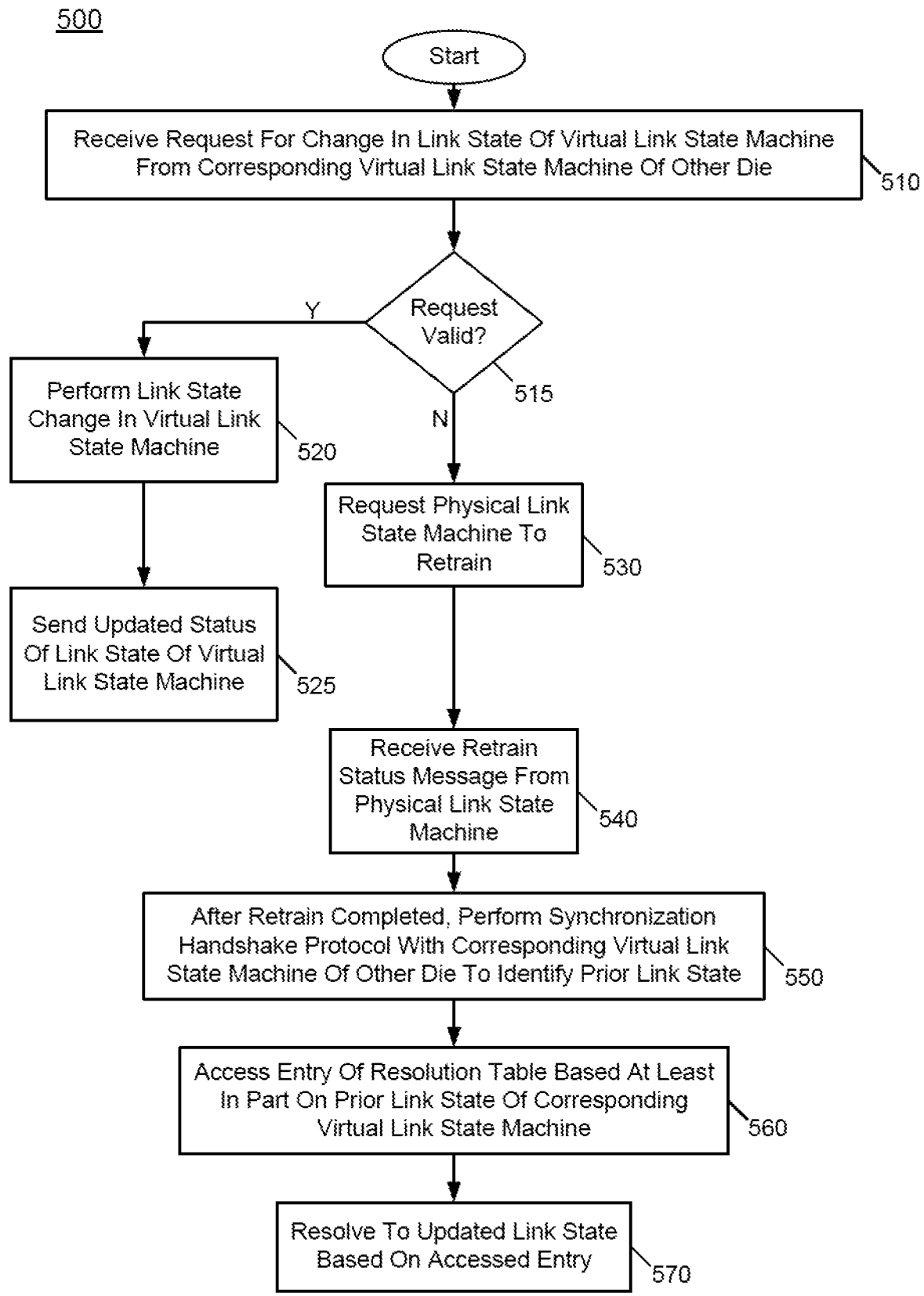
FIG. 5 is a flow diagram of a method in accordance with another embodiment of the present invention.

Referring now to FIG. 5, shown is a flow diagram of a method in accordance with another embodiment of the present invention. More specifically, method 500 of FIG. 5 is a method for performing a synchronization between a corresponding pair of virtual link state machines in accordance with an embodiment. As such, method 500 may be performed by hardware circuitry, firmware, software and/or combinations thereof. In a particular embodiment, method 500 may be performed by virtual link state machines and their underlying circuitry.

As illustrated, method 500 begins by receiving a request for a change in a link state of a virtual link state machine from a corresponding virtual link state machine located on another die (block 510). Next it is determined whether this request is valid (diamond 515). For example it may be determined whether a message providing the request is correctly received and decoded. If so, control passes to block 520 where the link state change may be performed in the virtual link state machine. Thereafter, control passes to block 525 where an updated status of the link state of this virtual link state machine may be sent (e.g., to the corresponding virtual link state machine on the other die).

Still referring to FIG. 5, instead if it is determined that the request is not valid, e.g., due to an error in the message carrying the request, control passes to block 530 where a request may be sent to a physical link state machine to perform a retraining process, which may occur as discussed above. In response to initiation of such retraining process, the physical link state machine may send a retrain status message that is received by all virtual link state machines (block 540).

Still referring to FIG. 5, next at block 550 after retraining is completed, a synchronization handshake protocol may be performed between corresponding virtual link state machines on the two dies. As a result of this synchronization handshake protocol, each virtual link state machine of the pair may identify a prior link state of the other virtual link state machine (namely, prior to the retraining). Next each virtual link state machine may access an entry of a resolution table based at least in part on the prior link state of the other die's virtual link state machine (block 560). Based on information present in the accessed entry, at block 570 the link state for the virtual link state machine may be resolved to an updated link state. As such, it is possible for a given virtual link state machine to update its state (or not) based upon information in the accessed entry. Understand while shown at this high level in the embodiment of FIG. 5, many variations and alternatives are possible.

Figure 6A:
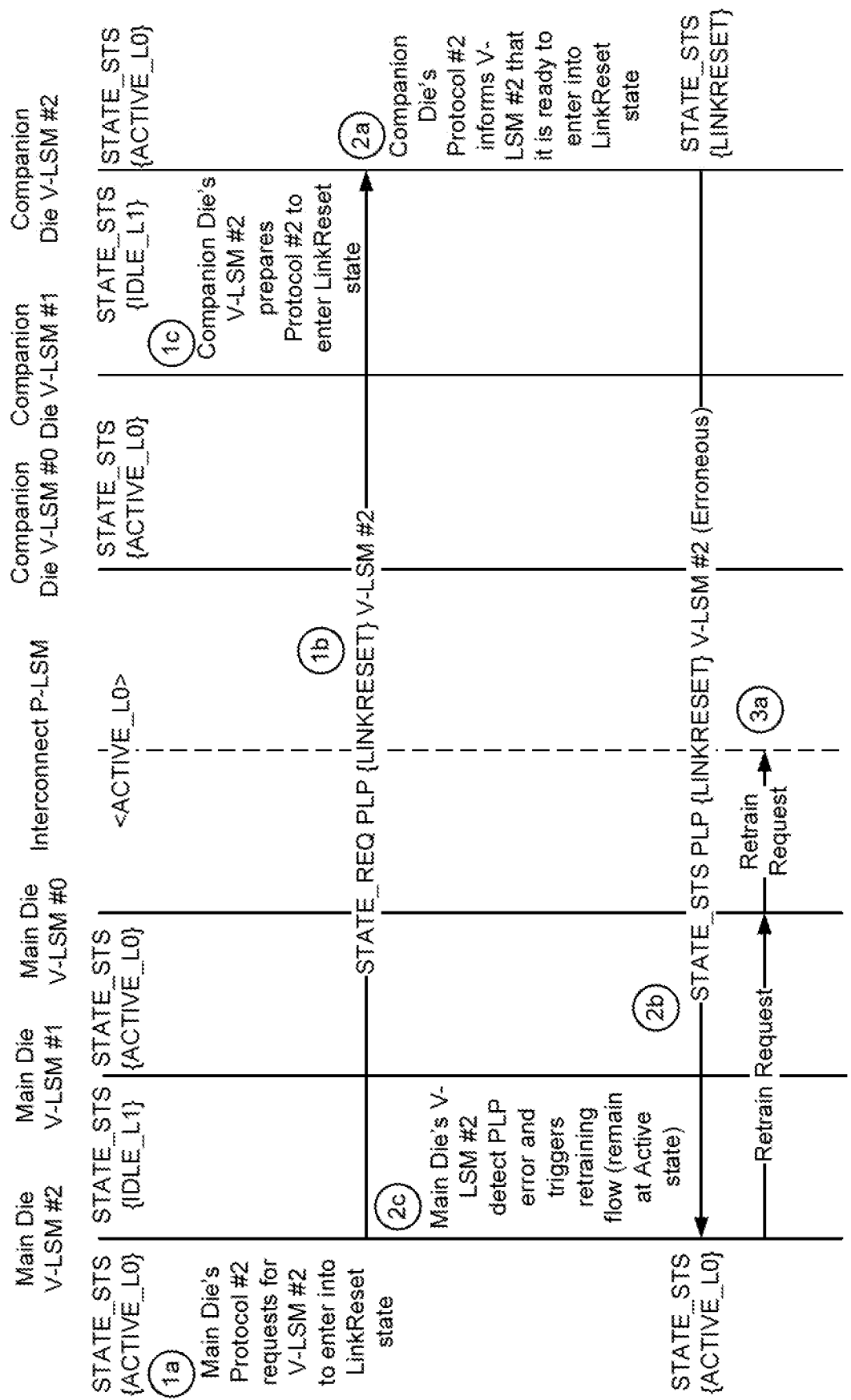
FIGS. 6A-6C illustrate an example technique for performing synchronization for a plurality of virtual link state machines following a retraining process in accordance with an embodiment of the present invention.
Figure 6B:
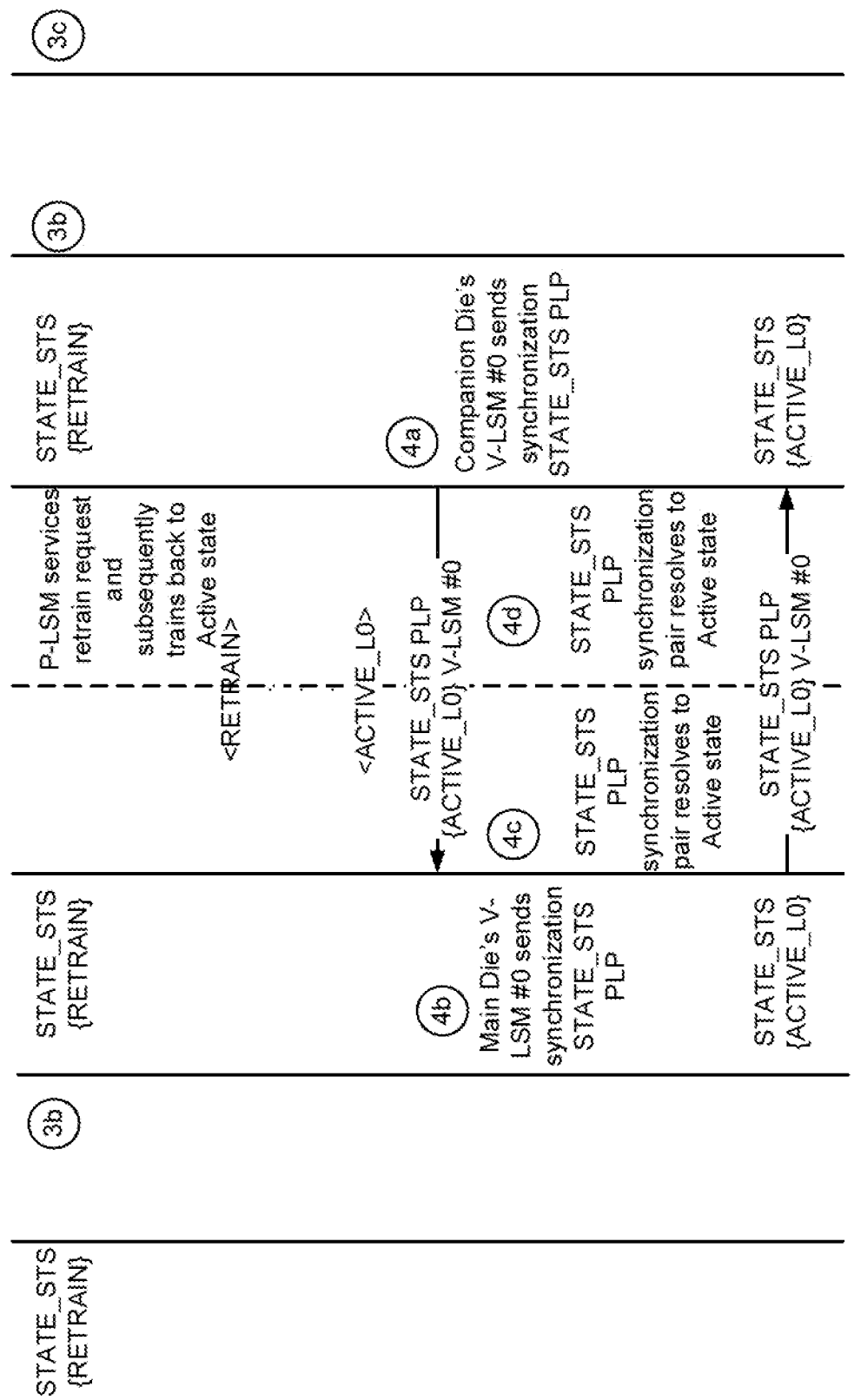
Figure 6C:
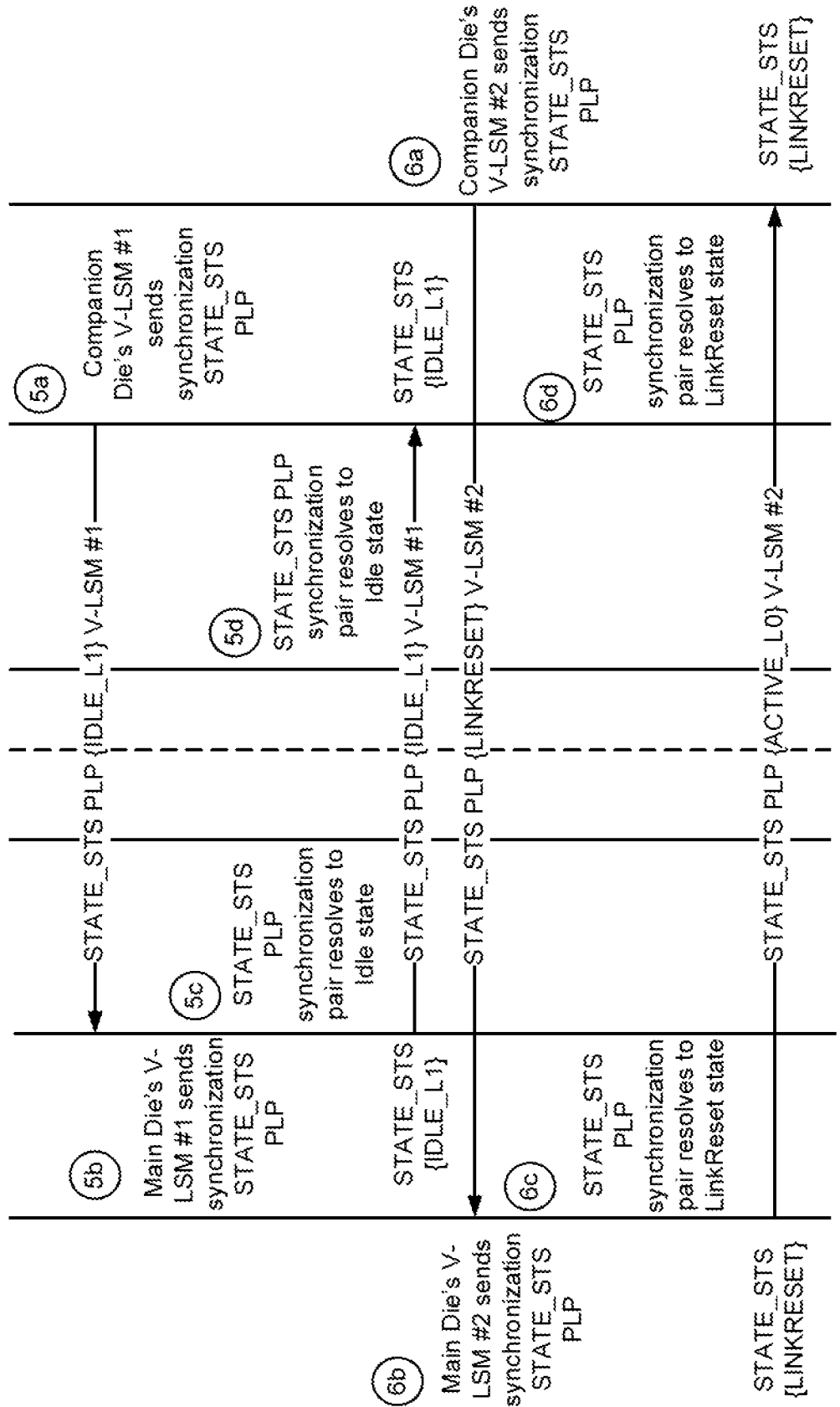

Referring now to FIGS. 6A-6C, shown is an example technique for performing synchronization for a plurality of V-LSMs following a retraining process. The detailed sequence of events are described below:
1) Main Die's V-LSM #2 Requesting for LINKRESET state entry
   a. Main Die's Protocol #2 requests for LINKRESET state entry
   b. Main Die's V-LSM #2 sends STATE_REQ==LINKRESET PLP
   c. Companion Die's V-LSM #2 receives the PLP and prepares Protocol #2 for LINKRESET entry
2) Companion Die's V-LSM #2 Acknowledging LINKRESET state entry
   a. Companion Die's Protocol #2 informs V-LSM #2 it is ready for LINKRESET entry
   b. Companion Die's V-LSM #2 moves to LINKRESET state and sends STATE_STS==LINKRESET PLP over. However the PLP gets corrupted during transmission
   c. Main Die's V-LSM #2 detects PLP error and triggers retraining flow. It remains at Active state
3) P-LSM performs retraining flow as requested
   a. P-LSM services the retrain request and subsequently trains back to ACTIVE_L0 state. STATE_STS==RETRAIN is reflected back to all V-LSMs (but the STATE_STS is not reflected on non-active LPIF interfaces (such that the inactive protocol layer does not receive the RETRAIN state)
   b. Main die's V-LSM #1 and Companion die's V-LSM #1 remain at IDLE_L1 state
   c. Companion die's V-LSM #2 remains at LINKRESET state
4) Synchronization of V-LSM #0 pair
   a. Companion Die's V-LSM #0 sends synchronization STATE_STS==ACTIVE_L0 PLP b. Main Die's V-LSM #0 sends synchronization STATE_STS==ACTIVE_L0 PLP
c. Main Die's V-LSM #0 resolves to STATE_STS==ACTIVE_L0 based on synchronization pair
d. Companion Die's V-LSM #0 resolves to STATE_STS==ACTIVE_L0 based on synchronization pair 5) Synchronization of V-LSM #1 pair
a. Companion Die's V-LSM #1 sends synchronization STATE_STS==IDLE_L1 PLP
b. Main Die's V-LSM #1 sends synchronization STATE_STS==IDLE_L1 PLP
c. Main Die's V-LSM #1 resolves to STATE_STS==IDLE_L1 based on synchronization pair
d. Companion Die's V-LSM #1 resolves to STATE_STS==IDLE_L1 based on synchronization pair 6) Synchronization of V-LSM #2 pair
a. Companion Die's V-LSM #2 sends synchronization STATE_STS==LINKRESET PLP
b. Main Die's V-LSM #2 sends synchronization STATE_STS==ACTIVE_L0 PLP
c. Main Die's V-LSM #2 resolves to STATE_STS==LINKRESET based on synchronization pair
d. Companion Die's V-LSM #2 resolves to STATE_STS==LINKRESET based on synchronization pair Thus as illustrated in FIGS. 6A-6C, virtual link state synchronization for the V-LSMs of the two dies occurs in a manner that is transparent to the protocol layer for a corresponding V-LSM #1 (Protocol #1), such that it may remain in a low power or other idle state throughout the process and without impacting power consumption, and further reducing complexity. Understand while shown at this high level in the FIGS. 6A-6C embodiment, many variations and alternatives are possible.

Figure 7:
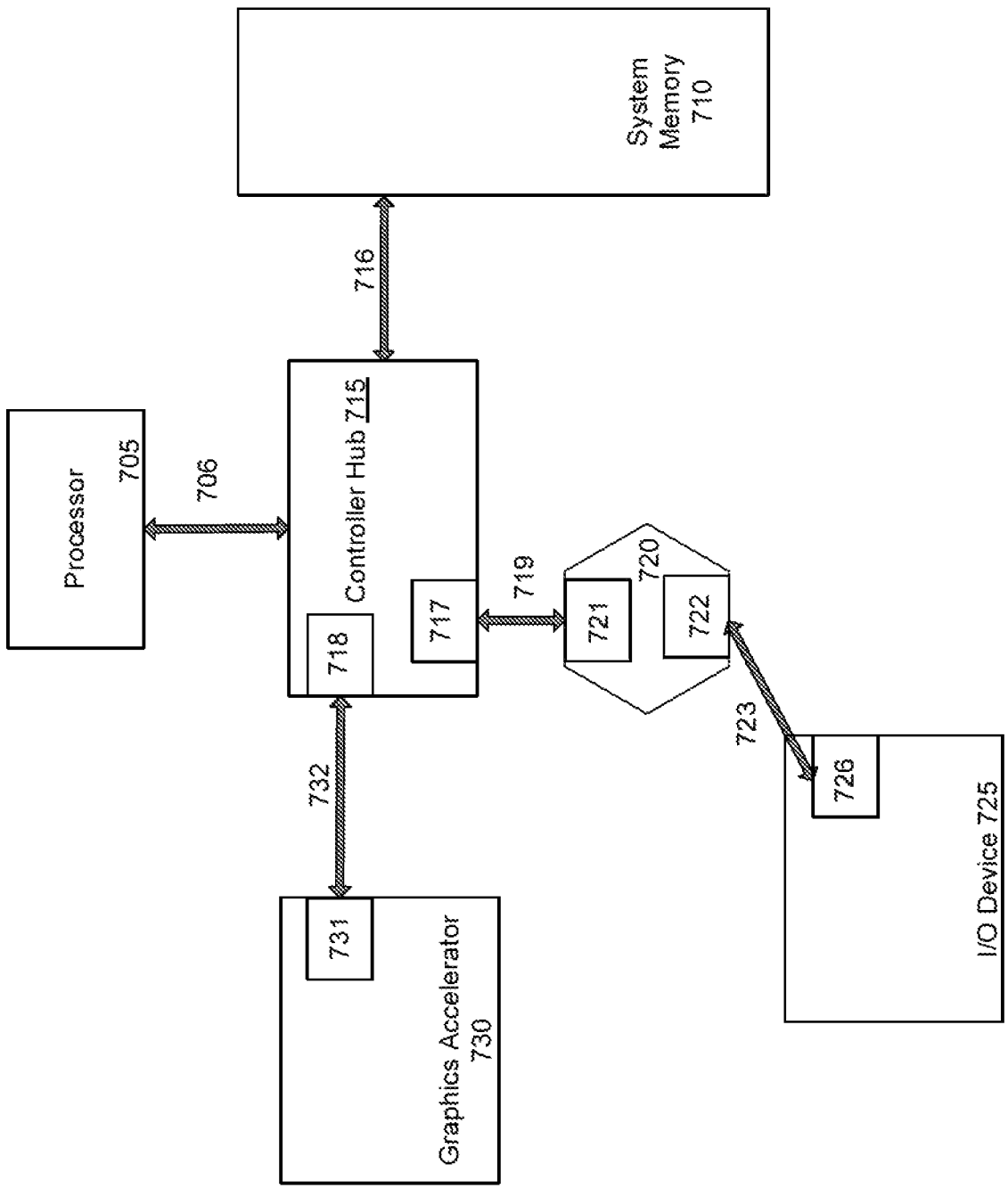
FIG. 7 is an embodiment of a fabric composed of point-to-point links that interconnect a set of components.

Embodiments may be implemented in a wide variety of interconnect structures. Referring to FIG. 7, an embodiment of a fabric composed of point-to-point links that interconnect a set of components is illustrated. System 700 includes processor 705 and system memory 710 coupled to controller hub 715. Processor 705 includes any processing element, such as a microprocessor, a host processor, an embedded processor, a co-processor, or other processor. Processor 705 is coupled to controller hub 715 through front-side bus (FSB) 706. In one embodiment, FSB 706 is a serial point-to-point interconnect. In another embodiment, link 706 may be any other interconnect such as an on-package interconnect architecture that includes physical circuitry to synchronize link states of virtual link state machines as described herein.

System memory 710 includes any memory device, such as random access memory (RAM), non-volatile (NV) memory, or other memory accessible by devices in system 700. System memory 710 is coupled to controller hub 715 through memory interface 716. Examples of a memory interface include a double-data rate (DDR) memory interface, a dual-channel DDR memory interface, and a dynamic RAM (DRAM) memory interface.

In one embodiment, controller hub 715 is a root hub, root complex, or root controller in a PCIe interconnection hierarchy. Examples of controller hub 715 include a chipset, a memory controller hub (MCH), a northbridge, an interconnect controller hub (ICH), a southbridge, and a root controller/hub. Often the term chipset refers to two physically separate controller hubs, i.e. a memory controller hub (MCH) coupled to an interconnect controller hub (ICH). Note that current systems often include the MCH integrated with processor 705, while controller 715 is to communicate with I/O devices, in a similar manner as described below. In some embodiments, peer-to-peer routing is optionally supported through root complex 715.

Here, controller hub 715 is coupled to switch/bridge 720 through serial link 719. Input/output modules 717 and 721, which may also be referred to as interfaces/ports 717 and 721, include/implement a layered protocol stack to provide communication between controller hub 715 and switch 720. In one embodiment, multiple devices are capable of being coupled to switch 720.

Switch/bridge 720 routes packets/messages from device 725 upstream, i.e., up a hierarchy towards a root complex, to controller hub 715 and downstream, i.e., down a hierarchy away from a root controller, from processor 705 or system memory 710 to device 725. Switch 720, in one embodiment, is referred to as a logical assembly of multiple virtual PCI-to-PCI bridge devices. Device 725 includes any internal or external device or component to be coupled to an electronic system, such as an I/O device, a Network Interface Controller (NIC), an add-in card, an audio processor, a network processor, a hard-drive, a storage device, a CD/DVD ROM, a monitor, a printer, a mouse, a keyboard, a router, a portable storage device, a Firewire device, a Universal Serial Bus (USB) device, a scanner, and other input/output devices and which may be coupled via an I3C bus, as an example. Often in the PCIe vernacular, such a device is referred to as an endpoint. Although not specifically shown, device 725 may include a PCIe to PCI/PCI-X bridge to support legacy or other version PCI devices. Endpoint devices in PCIe are often classified as legacy, PCIe, or root complex integrated endpoints.

Graphics accelerator 730 is also coupled to controller hub 715 through serial link 732. In one embodiment, graphics accelerator 730 is coupled to an MCH, which is coupled to an ICH. Switch 720, and accordingly I/O device 725, is then coupled to the ICH. I/O modules 731 and 718 are also to implement a layered protocol stack to communicate between graphics accelerator 730 and controller hub 715. A graphics controller or the graphics accelerator 730 itself may be integrated in processor 705.

Figure 8:
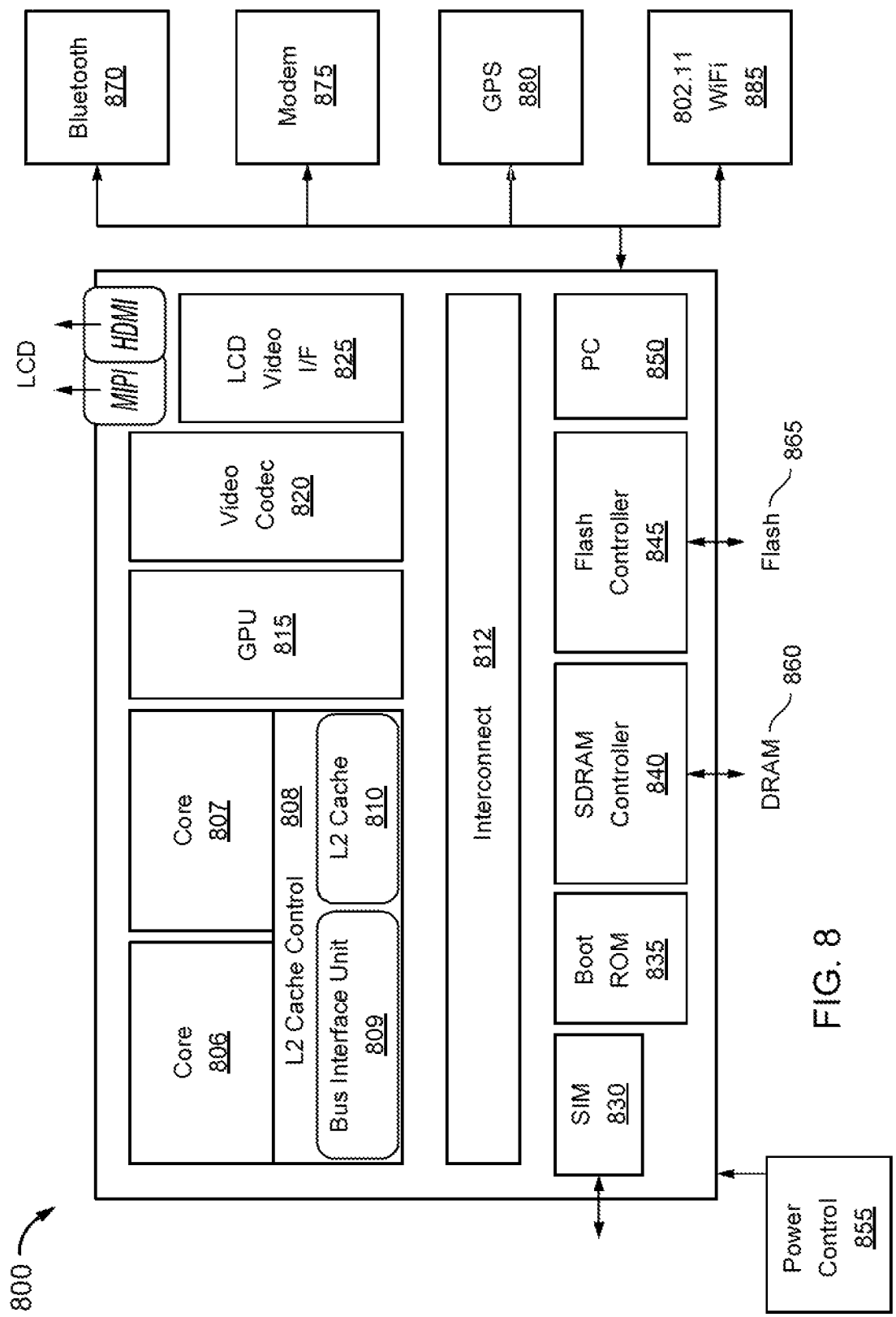
FIG. 8 is an embodiment of a system-on-chip design in accordance with an embodiment.

Turning next to FIG. 8, an embodiment of a SoC design in accordance with an embodiment is depicted. As a specific illustrative example, SoC 800 may be configured for insertion in any type of computing device, ranging from portable device to server system. Here, SoC 800 includes 2 cores 806 and 807. Cores 806 and 807 may conform to an Instruction Set Architecture, such as an Intel® Architecture Core™-based processor, an Advanced Micro Devices, Inc. (AMD) processor, a MIPS-based processor, an ARM-based processor design, or a customer thereof, as well as their licensees or adopters. Cores 806 and 807 are coupled to cache control 808 that is associated with bus interface unit 809 and L2 cache 810 to communicate with other parts of system 800 via an interconnect 812.

Interconnect 812 provides communication channels to the other components, such as a Subscriber Identity Module (SIM) 830 to interface with a SIM card, a boot ROM 835 to hold boot code for execution by cores 806 and 807 to initialize and boot SoC 800, a SDRAM controller 840 to interface with external memory (e.g., DRAM 860), a flash controller 845 to interface with non-volatile memory (e.g., flash 865), a peripheral controller 850 (e.g., an eSPI interface) to interface with peripherals, video codecs 820 and video interface 825 to display and receive input (e.g., touch enabled input), GPU 815 to perform graphics related computations, etc. Any of these interconnects/interfaces may incorporate aspects described herein, including synchronization of virtual link state machines. In addition, the system illustrates peripherals for communication, such as a Bluetooth module 870, 3G modem 875, GPS 880, and WiFi 885. Also included in the system is a power controller 855.

Figure 9:
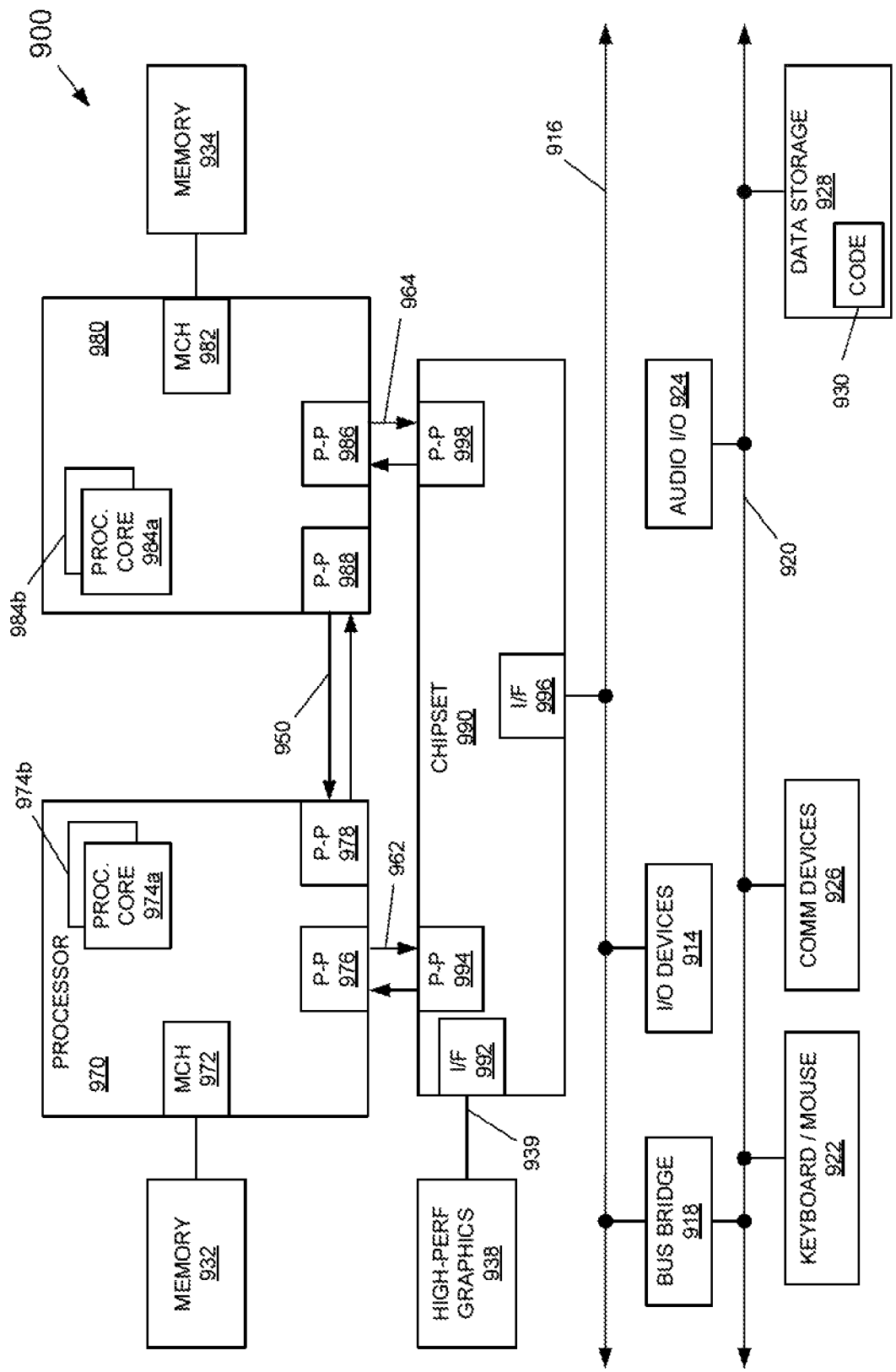
FIG. 9 is a block diagram of a system in accordance with an embodiment of the present invention.

Referring now to FIG. 9, shown is a block diagram of a system in accordance with an embodiment of the present invention. As shown in FIG. 9, multiprocessor system 900 includes a first processor 970 and a second processor 980 coupled via a point-to-point interconnect 950. As shown in FIG. 9, each of processors 970 and 980 may be many core processors including representative first and second processor cores (i.e., processor cores 974*a* and 974*b* and processor cores 984*a* and 984*b*).

Still referring to FIG. 9, first processor 970 further includes a memory controller hub (MCH) 972 and point-to-point (P-P) interfaces 976 and 978. Similarly, second processor 980 includes a MCH 982 and P-P interfaces 986 and 988. As shown in FIG. 9, MCH's 972 and 982 couple the processors to respective memories, namely a memory 932 and a memory 934, which may be portions of system memory (e.g., DRAM) locally attached to the respective processors. First processor 970 and second processor 980 may be coupled to a chipset 990 via P-P interconnects 962 and 964, respectively. As shown in FIG. 9, chipset 990 includes P-P interfaces 994 and 998.

Furthermore, chipset 990 includes an interface 992 to couple chipset 990 with a high performance graphics engine 938, by a P-P interconnect 939. As shown in FIG. 9, various input/output (I/O) devices 914 may be coupled to first bus 916, along with a bus bridge 918 which couples first bus 916 to a second bus 920. Various devices may be coupled to second bus 920 including, for example, a keyboard/mouse 922, communication devices 926 and a data storage unit 928 such as a disk drive or other mass storage device which may include code 930, in one embodiment. Further, an audio I/O 924 may be coupled to second bus 920. Any of the devices shown in FIG. 9 may be configured to perform synchronization of virtual link state machines for one or more of the interconnect structures, as described herein.

The following examples pertain to further embodiments.

In one example, an apparatus includes: an arbitration circuit comprising a first virtual link state machine to virtualize a link state associated with a first communication protocol stack and a second virtual link state machine to virtualize a link state associated with a second communication protocol stack, the first and second communication protocol stacks to communicate via a physical link; and a physical circuit coupled to the arbitration circuit and to interface with a first side of the physical link. The physical circuit, in response to a retraining of the physical link, may cause a plurality of virtual link state machines including the first and second virtual link state machines to synchronize with corresponding virtual link state machines associated with a second side of the physical link, where one of the first and second communication protocol stacks is to remain in a low power state during the retraining and the synchronization.

In one example, the apparatus comprises a multi-chip package having: a first die having the first communication protocol stack and the second communication protocol stack and coupled to the first side of the physical link; and a second die coupled to the first die via the second side of the physical link and having the first communication protocol stack and the second communication protocol stack, the second die having the corresponding virtual link state machines associated with the second side of the physical link.

In one example, in response to a physical layer packet received from the corresponding first virtual link state machine of the second die, the first virtual link state machine of the first die is to resolve from a first link state to a second link state.

In one example, the apparatus further comprises a resolution table including a plurality of entries each to identify a resolved link state for a pair of corresponding virtual link state machines.

In one example, the first virtual link state machine of the first die is to access a first entry of the resolution table to determine to resolve from the first link state to the second link state.

In one example, after the retraining of the physical link, the first virtual link state machine of the first die is to enable the first communication protocol stack of the first die to retry communication of one or more packets.

In one example, the first virtual link state machine of the second die is to autonomously send the physical layer packet without interaction with the first communication protocol stack of the second die.

In one example, the apparatus further comprises a third virtual link state machine to virtualize a link state of the arbitration circuit.

In one example, the apparatus further comprises a link logical physical circuit comprising the third virtual link state machine.

In one example, the link logical physical circuit further comprises a physical link state machine to interface with the physical circuit.

In one example, the physical link state machine is to cause the physical link to be retrained in response to a retrain request from the first virtual link state machine, based on detection of an error in a link state change request message.

In another example, a method comprises: retraining a physical link that couples a first die of a semiconductor package to a second die of the semiconductor package, the first die and the second die each including a first communication protocol stack and a second communication protocol stack, a first virtual link state machine to virtualize a link state associated with the first communication protocol stack and a second virtual link state machine to virtualize a link state associated with the second communication protocol stack; after retraining the physical link, performing a first synchronization handshake protocol between the first virtual link state machine of the first die and the first virtual link state machine of the second die, and performing a second synchronization handshake protocol between the second virtual link state machine of the first die and the second virtual link state machine of the second die; and thereafter enabling the first communication protocol stack of the first die and the first communication protocol stack of the second die for activity, where the second communication protocol stack of at least one of the first die and the second die is maintained in a low power state throughout the retraining and the first and second synchronization handshake protocols.

In one example, the first synchronization handshake protocol comprises: sending, from the first virtual link state machine of the first die, a first physical layer packet to the first virtual link state machine of the second die, the first physical layer packet to identify a link state of the first virtual link state machine of the first die prior to the retraining; and receiving, in the first virtual link state machine of the first die, a second physical layer packet from the first virtual link state machine of the second die, the second physical layer packet to identify a link state of the first virtual link state machine of the second die prior to the retraining.

In one example, the first synchronization handshake protocol further comprises: accessing a resolution table based on at least one of the link state of the first virtual link state machine of the first die prior to the retraining and the link state of the first virtual link state machine of the second die prior to the retraining; obtaining a resolution action from the resolution table; and updating a link state of at least one of the first virtual link state machine of the first die and the first virtual link state machine of the second die according to the resolution action.

In one example, the method further comprises maintaining the second communication protocol layer of the first die in the low power state during the second synchronization handshake protocol, the second communication protocol layer associated with the second virtual link state machine of the first die.

In another example, a computer readable medium including instructions is to perform the method of any of the above examples.

In another example, a computer readable medium including data is to be used by at least one machine to fabricate at least one integrated circuit to perform the method of any one of the above examples.

In another example, an apparatus comprises means for performing the method of any one of the above examples.

In yet another example, a multi-chip package comprises: a first die comprising a first communication protocol stack and a second communication protocol stack, and a first common physical circuit. The first common physical circuit may include: a first arbitration circuit comprising a first virtual link state machine to virtualize a link state associated with the first communication protocol stack and a second virtual link state machine to virtualize a link state associated with the second communication protocol stack; a first logical link layer comprising a third virtual link state machine to virtualize a link state associated with the first arbitration circuit; and a link physical circuit to interface with an interconnect. The package may further include the interconnect coupled to the link physical circuit and a second die coupled to the interconnect, where the second die comprises the first communication protocol stack and the second communication protocol stack, and a second common physical circuit. In response to a retraining of the interconnect, the first, second and third virtual link state machines are to synchronize with corresponding virtual link state machines of the second die while one of the first and second communication protocol stacks is to remain in a low power state.

In one example, in response to a physical layer packet sent autonomously from the corresponding first virtual link state machine of the second die, the first virtual link state machine of the first die is to resolve from a first link state to a second link state.

In one example, the multi-chip package further comprises a resolution table including a plurality of entries each to identify a resolved link state for a pair of corresponding virtual link state machines.

In one example, the first virtual link state machine of the first die is to access a first entry of the resolution table to determine to resolve from the first link state to the second link state.

In one example, after the retraining of the physical link throughout which the second communication protocol stack of the first die remains in an inactive state, the first virtual link state machine of the first die is to cause the first communication protocol stack of the first die to retry communication of one or more packets while the second communication protocol stack of the first die remains in the inactive state.

Understand that various combinations of the above examples are possible.

Note that the terms "circuit" and "circuitry" are used interchangeably herein. As used herein, these terms and the term "logic" are used to refer to alone or in any combination, analog circuitry, digital circuitry, hard wired circuitry, programmable circuitry, processor circuitry, microcontroller circuitry, hardware logic circuitry, state machine circuitry and/or any other type of physical hardware component. Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. Embodiments also may be implemented in data and may be stored on a non-transitory storage medium, which if used by at least one machine, causes the at least one machine to fabricate at least one integrated circuit to perform one or more operations. Still further embodiments may be implemented in a computer readable storage medium including information that, when manufactured into a SoC or other processor, is to configure the SoC or other processor to perform one or more operations. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An apparatus comprising:
a first protocol stack circuit comprising a first transaction layer and a first link layer;
a second protocol stack circuit comprising a second transaction layer and a second link layer;
an arbiter/multiplexer (ARB/MUX) coupled to the first protocol stack circuit and the second protocol stack circuit, the ARB/MUX to multiplex first information of the first protocol stack circuit and second information of the second protocol stack circuit, wherein the ARB/MUX comprises:
a first virtual link state machine (vLSM) for the first link layer, the first vLSM associated with and to virtualize a link state of the first link layer; and
a second vLSM for the second link layer, the second vLSM associated with and to virtualize a link state of the second link layer;
wherein the first vLSM is to:
send a first status synchronization message, the first status synchronization message to identify a link state of the first vLSM; and
receive a second status synchronization message, the second status synchronization message to identify a link state of a third vLSM, wherein based at least in part on the link state of the first vLSM and the link state of the third vLSM, the ARB/MUX is to determine a resolved vLSM state.

2. The apparatus of claim 1, wherein the ARB/MUX is to determine the resolved vLSM state to be a common link state to which the first vLSM and the third vLSM are resolved.

3. The apparatus of claim 2, wherein the ARB/MUX is to determine the common link state to be an active state when the link state of the first vLSM is the active state and the link state of the third vLSM is a reset state.

4. The apparatus of claim 2, wherein the ARB/MUX is to determine the common link state to be an active state when the link state of the first vLSM is the active state and the link state of the third vLSM is a retrain state.

5. The apparatus of claim 1, wherein the first vLSM is to send the first status synchronization message comprising a physical layer packet.

6. The apparatus of claim 5, wherein the first vLSM is to send the physical layer packet comprising a double word packet.

7. The apparatus of claim 1, wherein:
the first vLSM is to send a state control request to the third vLSM to indicate that the first vLSM is to enter into a first vLSM state; and
in response to the state control request, the third vLSM is to send a status message to indicate that the third vLSM is in the first vLSM state.

8. The apparatus of claim 1, further comprising a sideband interface to communicate sideband information with a device to couple to the apparatus via a link, the apparatus comprising the third vLSM.

9. The apparatus of claim 8, wherein the sideband interface is to communicate the sideband information on a second link separate from the link.

10. The apparatus of claim 1, wherein the first vLSM is to perform a synchronization protocol with the third vLSM while the first transaction layer is in a low power state.

11. A method comprising:
multiplexing, in an arbiter/multiplexer (ARB/MUX) of a first device, first information of a first protocol stack circuit and second information of a second protocol stack circuit, the ARB/MUX comprising:
a first virtual link state machine (vLSM) for a first link layer, the first vLSM associated with and to virtualize a link state of the first link layer; and
a second vLSM for a second link layer, the second vLSM associated with and to virtualize a link state of the second link layer, the first device comprising the first protocol stack circuit comprising a first transaction layer and the first link layer and the second protocol stack circuit comprising a second transaction layer and the second link layer;
sending, from the first vLSM, a first status synchronization message, the first status synchronization message to identify a link state of the first vLSM;
receiving a second status synchronization message, the second status synchronization message to identify a link state of a third vLSM; and
based at least in part on the link state of the first vLSM and the link state of the third vLSM, determining a resolved vLSM state.

12. The method of claim 11, further comprising determining the resolved vLSM state to be a common link state.

13. The method of claim 12, further comprising determining the common link state to be an active state when the link state of the first vLSM is the active state and the link state of the third vLSM is a reset state.

14. The method of claim 12, further comprising determining the common link state to be an active state when the link state of the first vLSM is the active state and the link state of the third vLSM is a retrain state.

15. The method of claim 12, further comprising sending, from the first vLSM, the first status synchronization message comprising a double word physical layer packet.

16. The method of claim 12, further comprising sending, from the first device, sideband information to a second device, the second device comprising the third vLSM.

17. A system comprising:
a first processor having a first plurality of processor cores;
a second processor having a second plurality of processor cores; and
a point-to-point interconnect to couple the first processor with the second processor, wherein the first processor further comprises:
a first protocol stack circuit comprising a first transaction layer and a first link layer;
a second protocol stack circuit comprising a second transaction layer and a second link layer;
an arbiter/multiplexer (ARB/MUX) coupled to the first protocol stack circuit and the second protocol stack circuit, the ARB/MUX to multiplex first information of the first protocol stack circuit and second information of the second protocol stack circuit, wherein the ARB/MUX comprises:
a first virtual link state machine (vLSM) for the first link layer, the first vLSM associated with and to virtualize a link state of the first link layer; and
a second vLSM for the second link layer, the second vLSM associated with and to virtualize a link state of the second link layer;
wherein the first vLSM is to:
send a first status synchronization message to a third vLSM, the first status synchronization message to identify a link state of the first vLSM; and
receive a second status synchronization message, the second status synchronization message to identify a link state of the third vLSM, wherein based at least in part on the link state of the first vLSM and the link state of the third vLSM, the ARB/MUX is to determine a resolved vLSM state.

18. The system of claim 17, wherein the ARB/MUX is to determine the resolved vLSM state to be a common link state to which the first vLSM and the third vLSM are resolved.

19. The system of claim 18, wherein the ARB/MUX is to determine the common link state to be an active state when the link state of the first vLSM is the active state and the link state of the third vLSM is a reset state.

20. The system of claim 17, wherein the first vLSM is to send the first status synchronization message comprising a double word physical layer packet.

* * * * *